United States Patent [19]

Inoue

[11] Patent Number: 5,532,760
[45] Date of Patent: Jul. 2, 1996

[54] RECEIVER CAPABLE OF SELECTIVELY RECEIVING SATELLITE BROADCAST TV SIGNALS AND AUDIO SCPC SIGNALS

[75] Inventor: Atsushi Inoue, Tokyo, Japan

[73] Assignee: Uniden Corporation, Chiba, Japan

[21] Appl. No.: 224,717

[22] Filed: Apr. 8, 1994

[30] Foreign Application Priority Data

Sep. 29, 1993 [JP] Japan ................................. 5-242466

[51] Int. Cl.⁶ .............................. H04N 5/46; H04H 1/00
[52] U.S. Cl. ............................................. 348/729; 455/3.2
[58] Field of Search .......................... 455/3.2; 348/725, 348/726, 727, 728, 729, 423, 473, 484, 485, 486, 10, 11; H04N 5/46

[56] References Cited

U.S. PATENT DOCUMENTS

| | | | |
|---|---|---|---|
| 4,956,864 | 9/1990 | Brockman | 455/136 |
| 5,146,338 | 9/1992 | Lehmann et al. | 348/729 |
| 5,289,285 | 2/1994 | Kotaka et al. | 455/3.2 X |
| 5,305,382 | 4/1994 | Hayashi | 455/3.2 X |
| 5,313,651 | 5/1994 | Kurita | 348/729 X |
| 5,381,459 | 1/1995 | Lappington | 348/423 |
| 5,386,587 | 1/1995 | Yuzawa | 455/3.2 |
| 5,390,348 | 2/1995 | Magin et al. | 455/63 |

FOREIGN PATENT DOCUMENTS

| | | | |
|---|---|---|---|
| 54-47506 | 4/1979 | Japan | H04B 1/26 |
| 4339418 | 11/1992 | Japan | H04B 1/16 |
| 5049032 | 2/1993 | Japan | H04N 7/20 |
| 5064101 | 3/1993 | Japan | H04N 5/455 |

Primary Examiner—Victor R. Kostak
Assistant Examiner—John W. Miller
Attorney, Agent, or Firm—Fish & Richardson

[57] ABSTRACT

A satellite broadcast receiver capable of receiving audio SCPC signals is disclosed in which the receiver comprises an RF reception unit for receiving television signals and audio SCPC signals broadcast from a satellite, frequency converter for converting an RF output from said RF reception unit into an IF signal, separator for separating the output of said frequency converter into a television signal and an audio SCPC signal, a TV signal processing unit for receiving and processing a first output from the separator, an SCPC signal processing unit for receiving and processing a second output from the separator, and a selector for selecting any one of the outputs from the TV signal processing unit and said SCPC signal processing unit, thereby enabling selective reception of TV signals and audio SCPC signals broadcast from a satellite. The RF reception unit comprises an RF amplifier, and the frequency converter comprises a feedback circuit for selectively feeding the first and the second outputs of the separator back to the RF amplifier, thereby controlling a gain of the RF amplifier. The TV signal processing unit includes a video detector for receiving and detecting a television signal from the separator, an audio circuit for receiving an audio signal from the video detector, and a video circuit for receiving a video signal from the video detector. The selector comprises a switch for selecting any one of the outputs of the SCPC signal processing unit and the audio circuit.

12 Claims, 10 Drawing Sheets

RECEIVER CAPABLE OF SELECTIVELY RECEIVING SATELLITE BROADCAST TV SIGNALS AND AUDIO SCPC SIGNALS

BACKGROUND OF THE INVENTION

1. Field of the Invention

The present invention relates to a satellite broadcast receiver, and, more specifically, to a satellite broadcast receiver which is capable of receiving not only video signals but also audio SCPC (Single Channel Per Carrier) signals.

An SCPC system is known as a system in which one carrier is used per one signal channel and a plurality of those carriers are sent simultaneously, thereby transmitting a plurality of channels.

2. Description of the Prior Art

Recently, broadcast services have been expanded such that television signals and audio signals can be broadcast via satellite. Following this trend, various proposals have been made regarding receivers for television and audio signals broadcast from satellites.

Japanese Patent Public Disclosure No. 4-33948 published on Nov. 26, 1992 and Japanese Patent Public Disclosure No. 5-49032 published on Feb. 26, 1993 discloses that some circuit components are commonly used both for a satellite broadcast receiver and an audio PCM receiver.

An audio SCPC is one of the services provided by an SCPC signal utilizing a satellite. Usually, a receiver dedicated for the reception of this audio SCPC signal is required. Such a SCPC-dedicated receiver cannot receive satellite broadcast signal because the audio SCPC service employs a signal format quite different from that of the satellite broadcast.

Figure 1A:
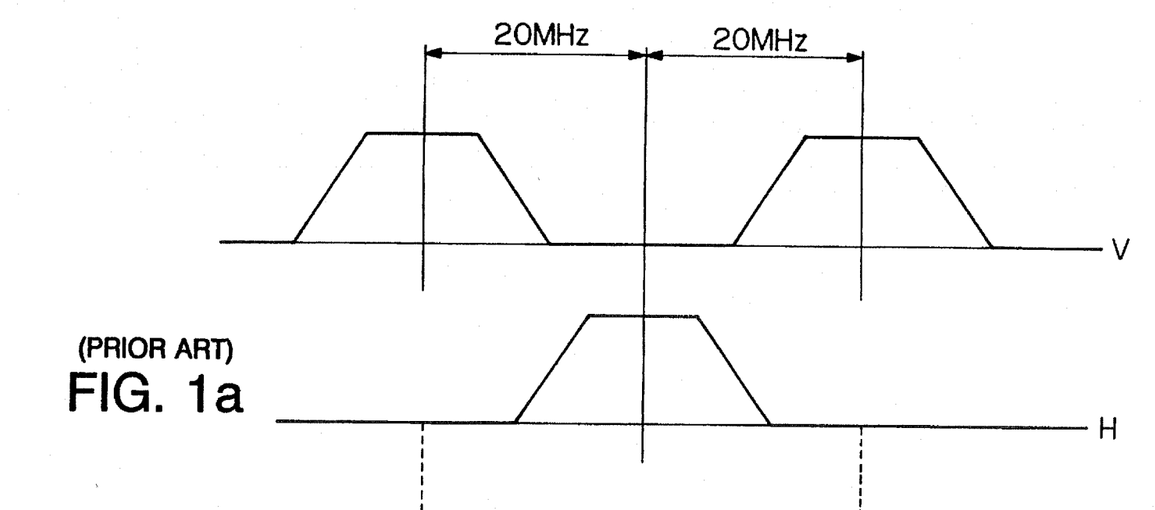
FIG. 1 illustrates available frequency bands of both satellite broadcast and audio SCPC signals.
Figure 1B:
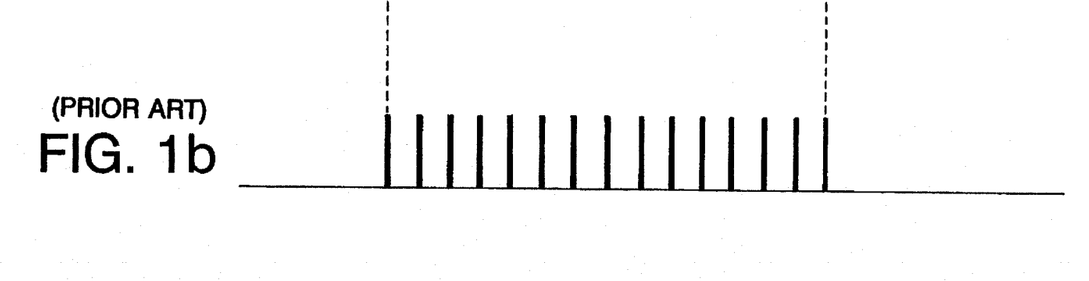

FIG. 1 schematically illustrates available frequency bands for satellite broadcast and the audio SCPC service. FIG. 1(a) illustrates frequency bands of vertical polarization and horizontal polarization signals in satellite broadcast channels separated from each other by 40 MHz. FIG. 1(b) illustrates a frequency allocation of an audio SCPC signal. As can be seen from this figure, a plurality of FM carriers are distributed within a frequency band of 40 MHz. Adjacent FM carriers are respectively spaced, for example, by 260 kHz and a frequency band of each FM carrier is 60 kHz in the case of an audio SCPC signal.

Since both satellite broadcast and audio SCPC services are provided through satellite broadcast, there is a user's need to develop a product which enables both satellite broadcast and the audio SCPC signals to be received by the same receiver. However, accommodating a satellite broadcast receiving circuit and an SCPC receiving circuit within a single receiver set results in a complicated receiver structure with high receiver costs.

Japanese Patent Public Disclosure No. 5-64101 published on Mar. 12, 1993 proposes a receiver in which a tuner device is commonly used for a demodulator of frequency-modulated video signals (video and audio) and a demodulator of MSK-modulated musical signals both sent via a satellite.

Incorporation of an audio SCPC receiving circuit into an ordinary satellite broadcast receiving system causes the following problems.

An output frequency of an LNB (low Noise Block Down Converter) provided in an antenna device of a satellite broadcast receiving system changes by approximately 3 MHz in one day under the influence of temperature. This frequency drift is larger than the receiving frequency bandwidth of an audio SCPC signal. However, even if an AFC circuit is used to conduct automatic frequency control so as to receive a desired SCPC signal, automatic frequency control over a wide frequency band cannot be achieved using a conventional AFC circuit due to limitations imposed by a pull-in range and a reception frequency band.

SUMMARY OF THE INVENTION

The present invention has been proposed to solve the above described deficiencies of a conventional AFC system.

It is therefore an object of the present invention to provide a simply structured, inexpensive satellite broadcast receiver capable of receiving audio SCPC signals.

It is a more specific object of the present invention to provide a satellite broadcast receiver which is capable of receiving audio SCPC signals and which employs a digital AFC system in which AFC operates in a wide frequency band, thereby overcoming defects of a conventional AFC system.

It is a further object of the present invention to realize an optimum AGC function at an RF section of a satellite broadcast receiver capable of receiving audio SCPC signals.

It is a still further object of the present invention to provide a satellite broadcast receiver capable of receiving audio SCPC signals and displaying a receiving condition of the audio SCPC signals on a display screen.

In order to achieve these objects, according to one aspect of the present invention, there is provided a satellite broadcast receiver capable of receiving audio SCPC signals, comprising:

RF reception means for receiving television signals and audio SCPC signals broadcast from a satellite;

frequency conversion means for converting an RF output from the RF reception means into an IF signal;

separation means for separating the output of the frequency conversion means into a television signal and an audio SCPC signal;

a TV signal processing unit for receiving and processing a first output from the separation means;

an SCPC signal processing unit for receiving and processing a second output from the separation means; and a selection means for selecting any one of the outputs from the TV signal processing unit and the SCPC signal processing unit, thereby enabling selective reception of TV signals and audio SCPC signals broadcast from a satellite.

In accordance with an embodiment of the present invention, the RF reception means comprises an RF amplifier, and the frequency conversion means comprises means for selectively feeding the first and the second outputs of the separation means back to the RF amplifier, thereby controlling a gain of the RF amplifier.

In accordance with an embodiment of the present invention, the TV signal processing unit includes a video detector for receiving and detecting a television signal from the separation means, an audio circuit for receiving an audio signal from the video detector, and a video circuit for receiving a video signal from the video detector, and the selection means comprises a switch for selecting any one of the outputs of the SCPC signal processing unit and the audio circuit.

According to another aspect of the present invention, there is provided a satellite broadcast receiver capable of receiving audio SCPC signals, comprising:

an IF unit for converting satellite broadcast signals and audio SCPC signals;

separator means for receiving and separating the output of the IF unit;

SCPC reception means connected to a first output of the separator means;

video detector means connected to a second output of the separator means;

audio signal processing means connected to an output of the video detector means;

video signal processing means connected to an output of the video detector means;

audio signal switching means connected to the outputs of the SCPC signal processing means and the audio signal processing means for selecting any one of the audio signals from those means.

In accordance with an embodiment of the present invention, the receiver further comprises a first IF amplifier connected between the separator means and the SCPC reception means, and a second IF amplifier connected between the separator means and the video detector means. In the case of audio SCPC signal reception, a first AGC signal is fed from the first IF amplifier back to an RF amplifier, whereas in the case of satellite broadcast signal reception, a second AGC signal is fed from the second IF amplifier back to the RF amplifier. This enables gain control of the RF amplifier.

According to a still another aspect of the present invention, there is provided a satellite broadcast receiver capable of receiving television signals and audio SCPC signals broadcast from satellite, comprising:

reception means for receiving television signals an audio SCPC signals broadcast from satellites:

RF amplification means for amplifying an RF signal from the reception means;

frequency conversion means for converting the RF signal into an IF signal;

separation means for separating the output of the frequency conversion means into a television signal and an audio SCPC signal;

SCPC reception means connected to a first output of the separation means;

video detector means connected to a second output of the separation means;

audio signal processing means connected to receive the output of the video detector means;

video signal processing means connected to receive the output of the video detector means;

audio signal changeover means connected to the SCPC reception means and the audio signal processing means for selecting any one of the outputs of those means; and control means for controlling the SCPC reception means in response to information about a reception condition of receipt of the audio SCPC signal.

In accordance with an embodiment of the present invention, the satellite broadcast receiver further comprises a first IF amplifier provided between the separation means and the SCPC reception means and a second IF amplifier between the separation means and the video detector means. In the case of receiving an SCPC signal, a first AGC signal is fed from the first IF amplifier back to an RF amplifier. In the case of receiving a satellite broadcast signal, a second AGC signal is fed from the second IF amplifier to the RF amplifier. Thus, a gain of the RF amplifier can be controlled.

In accordance with an embodiment of the present invention, the SCPC reception means comprises:

a frequency converter for mixing the output of a frequency synthesizer and an audio SCPC signal from the separation means to convert it into a SCPC.IF signal having a predetermined center frequency;

an FM detector for FM-detecting the SCPC.IF signal from the frequency converter to output an audio signal; and measurement means for outputting an SL value representing a signal level of the SCPC.IF signal inputted to the FM detector and an AFC value indicating a deviation of a frequency of the SCPC.IF signal from the predetermined center frequency. The control means comprises a microcomputer which, responsive to the SL and AFC values from the measurement means, control an oscillation frequency generated by the frequency synthesizer to cause a frequency of the SCPC.IF signal to coincide with the predetermined center frequency.

In accordance with an embodiment of the present invention, the microcomputer comprises:

means for changing a frequency of the oscillation frequency synthesizer at predetermined intervals;

means for receiving the SL and AFC values from the measurement means during the change of the oscillation frequency in the predetermined interval; and means for determining a frequency of the SCPC.IF signal using the received SL and AFC values, thereby controlling the oscillation frequency of the frequency synthesizer on the basis of the determined frequency.

In accordance with an embodiment of the present invention, the satellite broadcast receiver further comprises an OSG circuit for changing information about a condition of reception of an audio SCPC signal to a video signal to cause the video signal to be displayed.

It is advantageous that the present invention can provide a simply-structured, inexpensive satellite broadcast receiver. The receiver according to the present invention may achieve an AFC operation over a wide frequency range, thereby enabling a frequency of the SCPC.IF signal to stably follow the predetermined center frequency. Further, according to the present invention, an excellent automatic gain control can be achieved because AGC signals are fed back from the IF amplifiers to the RF amplifier in correspondence with which of the satellite broadcast signal and the audio SCPC signal is received. The OSG circuit may enable a user to select a condition of reception of the audio SCPC signal while referring to displayed information about reception condition.

The various features and advantages of the invention may be readily understood with reference to the following detailed description taken in conjunction with the accompanying drawings, wherein like reference numerals designate like structural elements.

DETAILED DESCRIPTION OF THE PREFERRED EMBODIMENTS

Figure 2:
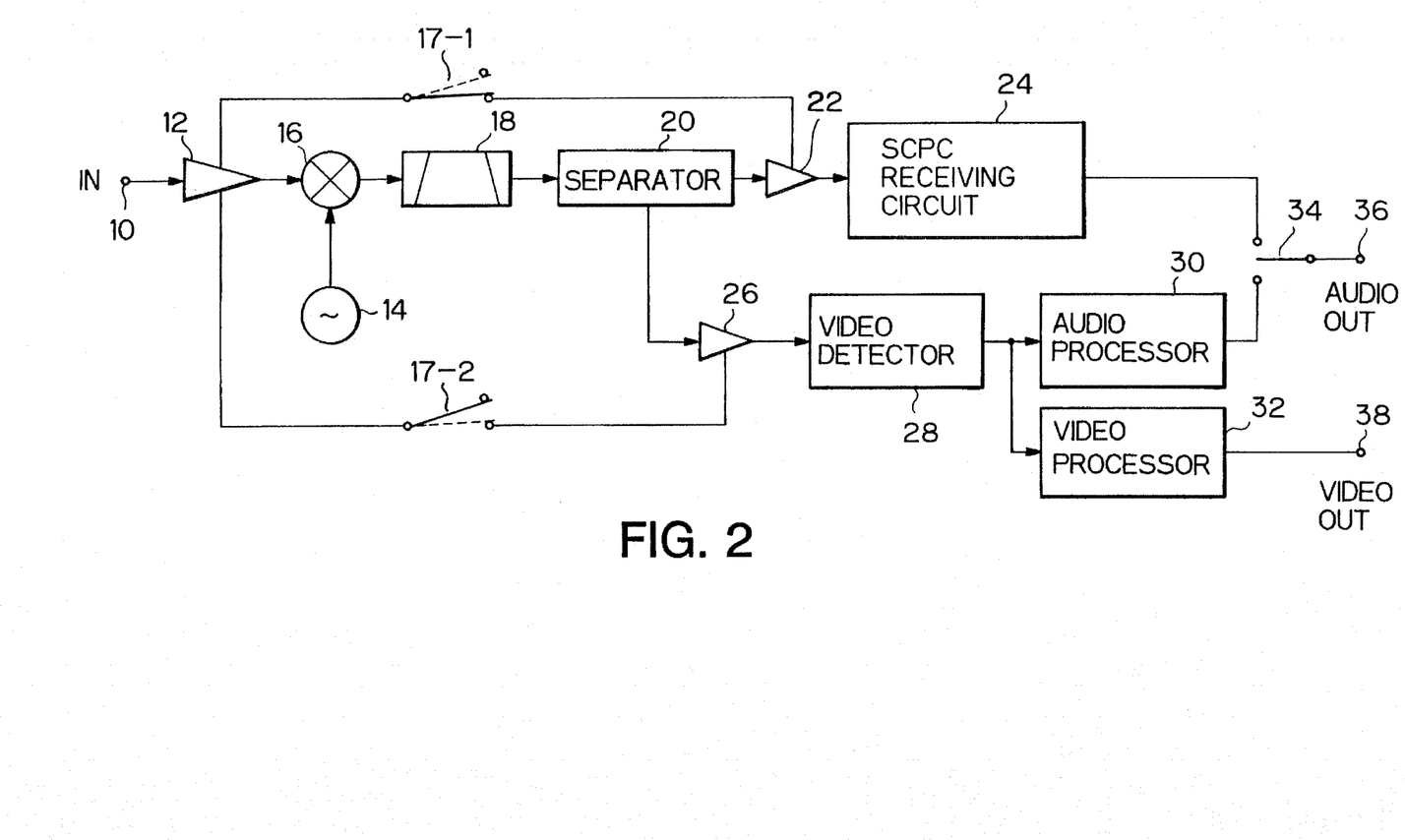
FIG. 2 shows a block diagram illustrating the structure of a preferred embodiment of a satellite broadcast receiver capable of receiving audio SCPC signals according to the present invention.

Referring to FIG. 2 showing a block diagram of the structure of an embodiment of a satellite broadcast receiver capable of receiving audio SCPC signals according to the present invention, the satellite broadcast receiver comprises an RF amplifier 12 which is connected to an antenna device (not illustrated) through an input terminal 10. An output terminal of RF amplifier 12 is connected to a mixer 16 which mixes a signal from RF amplifier 12 and an oscillation frequency signal of a local oscillator 14 and converts the mixed signals into an .intermediate frequency (IF) signal.

The output of the mixer 16 is connected to a separator 20 through a band-pass filter 18. One output of separator 20 is connected to an SCPC receiving circuit 24 through an IF amplifier 22, while the other output of separator 20 is connected to a video detector 28 through an IF amplifier 26. It is noted that IF amplifiers 22, 26 are provided for isolating video detector 28 from SCPC receiving circuit 24.

The output of video detector 28 is connected to an audio signal processing circuit 30 and a video signal processing circuit 32.

The outputs of SCPC receiving circuit 24 and audio signal processing circuit 30 are connected to an audio signal change-over device 34. The output of change-over device 34 is connected to an audio signal output terminal 36. The output of video signal processing circuit 32 is connected to a video signal output terminal 38.

Connected to audio signal output terminal 36 and video signal output terminal 38 are ordinary circuit for outputting audio and video signals to a speaker and a display screen of a television receiver.

Separator 20 is provided following band-pass filter 18 because as many circuits and components as possible can be commonly used in combination with an audio SCPC receiving circuit and a satellite broadcast receiving circuit for the purpose of simplifying circuitry and lowering the price of the apparatus. To this end, it is considered most preferable to use an RF receiving unit, an IF unit and an audio circuit in common between the audio SCPC signal receiving circuit and the satellite broadcast receiving circuit. In this embodiment, band-pass filter 18 forming a part of the IF unit is followed by SCPC receiving circuit 24 and the output of SCPC receiving circuit 24 is connected to audio signal change-over device 34.

In the case of receiving a satellite broadcast signal by the satellite broadcast receiver having such a structure as described above, audio signal change-over device 34 is set to the side of audio signal processing circuit 30. Then, a satellite broadcast signal is received by the antenna device, fed through input terminal 10, RF amplifier 12, mixer 16, band-pass filter 18, separator 20 and IF amplifier 26 to video detector 28 where a composite signal is taken out. Audio signal processing circuit 30 recovers an audio signal from the composite signal and supplies the recovered audio signal through audio signal change-over device 34 to audio signal output terminal 36. A video signal is recovered by video signal processing circuit 32 from the composite signal fed from video detector 28 and the recovered video signal is fed to video signal output terminal 38.

In the case of receiving an audio SCPC signal, audio signal change-over device 34 is set to the side of SCPC receiving circuit 24. An audio SCPC signal received by the antenna device is supplied through input terminal 10, RF amplifier 12, mixer 16, band-pass filter 18, separator 20 and IF amplifier 22 to SCPC receiving circuit 24 where an audio signal is taken out and fed through audio signal change-over device 34 to audio signal output terminal 36.

AGC control is carried out so as to adjust a gain of RF amplifier 12 to an optimum value during reception of satellite broadcast signals and audio SCPC signals. To this end, during reception of the satellite broadcast signal, the gain of RF amplifier 12 can preferably be controlled by feeding an output signal level of IF amplifier 26 back to RF amplifier 12, and, during reception of the audio SCPC signal, the gain can be controlled by feeding an output signal level of IF amplifier 22 back to RF amplifier 12. To achieve this, switches 17-1, 17-2 are provided which operate in an interlocking manner. When a satellite broadcast is received, switch 17-2 is closed and switch 17-1 is opened, and, when an audio SCPC signal is received, switch 17-1 is closed and switch 17-2 is opened.

According to the preferred embodiment described above, since the high frequency and IF circuit arranged from input terminal 10 to band-pass filter 18 are used in common for the purpose of enabling satellite broadcast and audio SCPC reception, a circuit constitution is advantageously simplified.

Figure 3:
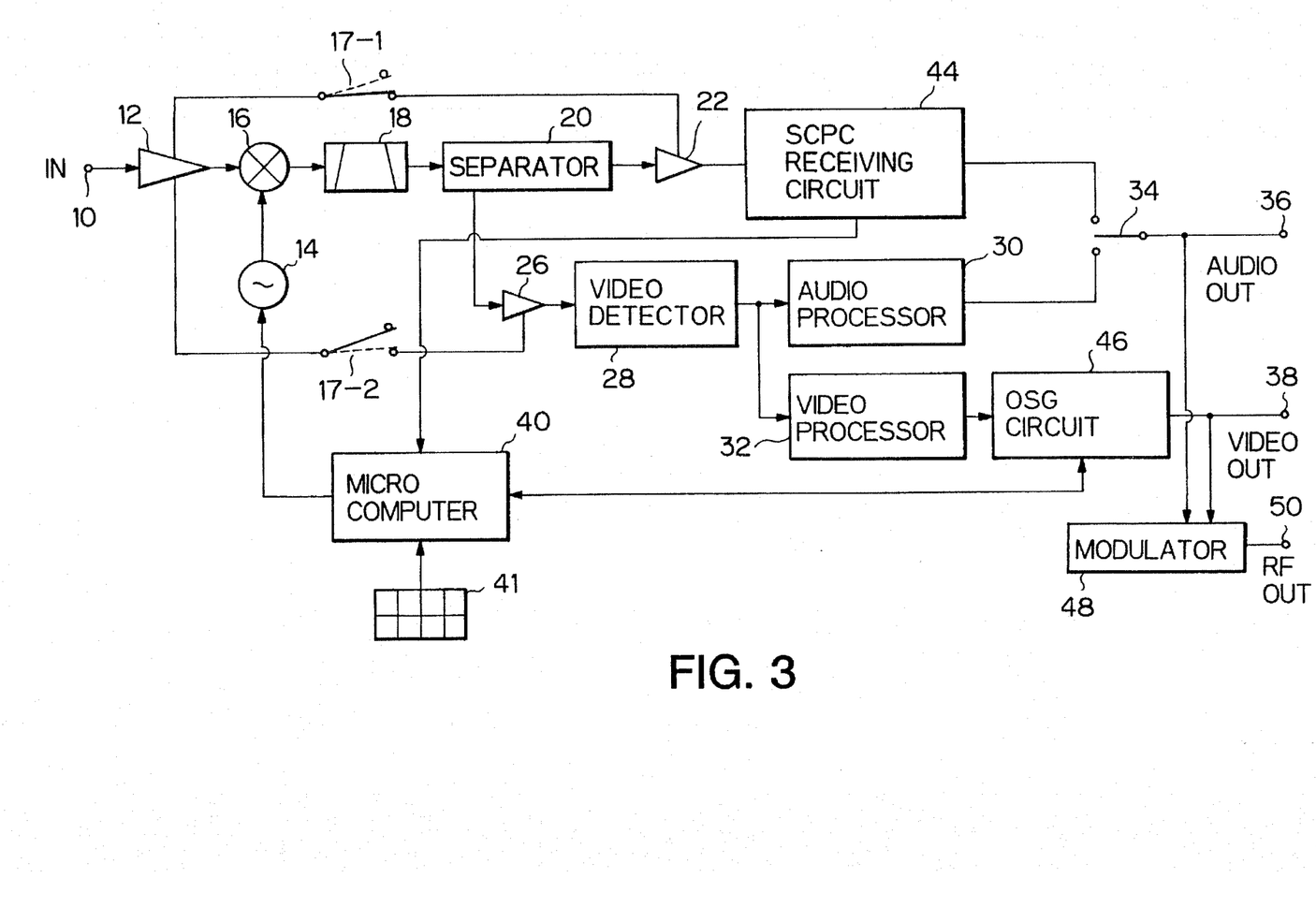
FIG. 3 shows a block diagram illustrating the structure of another embodiment of a satellite broadcast receiver capable of receiving audio SCPC signals according to the present invention.

Turning next to FIG. 3, there is shown a block diagram of the structure of another embodiment of a satellite broadcast receiver according to the present invention. Elements similar to those shown in FIG. 2 are designated by the same reference numerals. The embodiment shown in FIG. 3 comprises a microcomputer 40 which has key switches 41 and controls SCPC receiving circuit 44 to realize an AFC (Automatic Frequency Control) function. In addition, this embodiment also enables a condition of reception of SCPC signals to be adjusted by means of displaying the receiving condition on a TV receiver through an OSG (On Screen Graphic) circuit. Specifically, OSG circuit 46 is provided between video signal processing circuit 32 and video signal output terminal 38 for converting information about a condition of reception of an audio SCPC signal given from microcomputer 40 into a video signal.

Audio signal output terminal 36 and video signal output terminal 38 are respectively connected to a modulator 48 which operates to modulate a carrier with the audio and video signals fed from terminals 36, 38. The output of modulator 48 is connected to an RF output terminal 50. Modulator 48 is provided for a TV receiver of a type having an RF input terminal to which a signal is fed from RF output terminal 50.

As in the embodiment shown in FIG. 2, RF amplifier 12 is gain-controlled by feeding the outputs of IF amplifiers 22, 26 back to RF amplifier 12.

Figure 4:
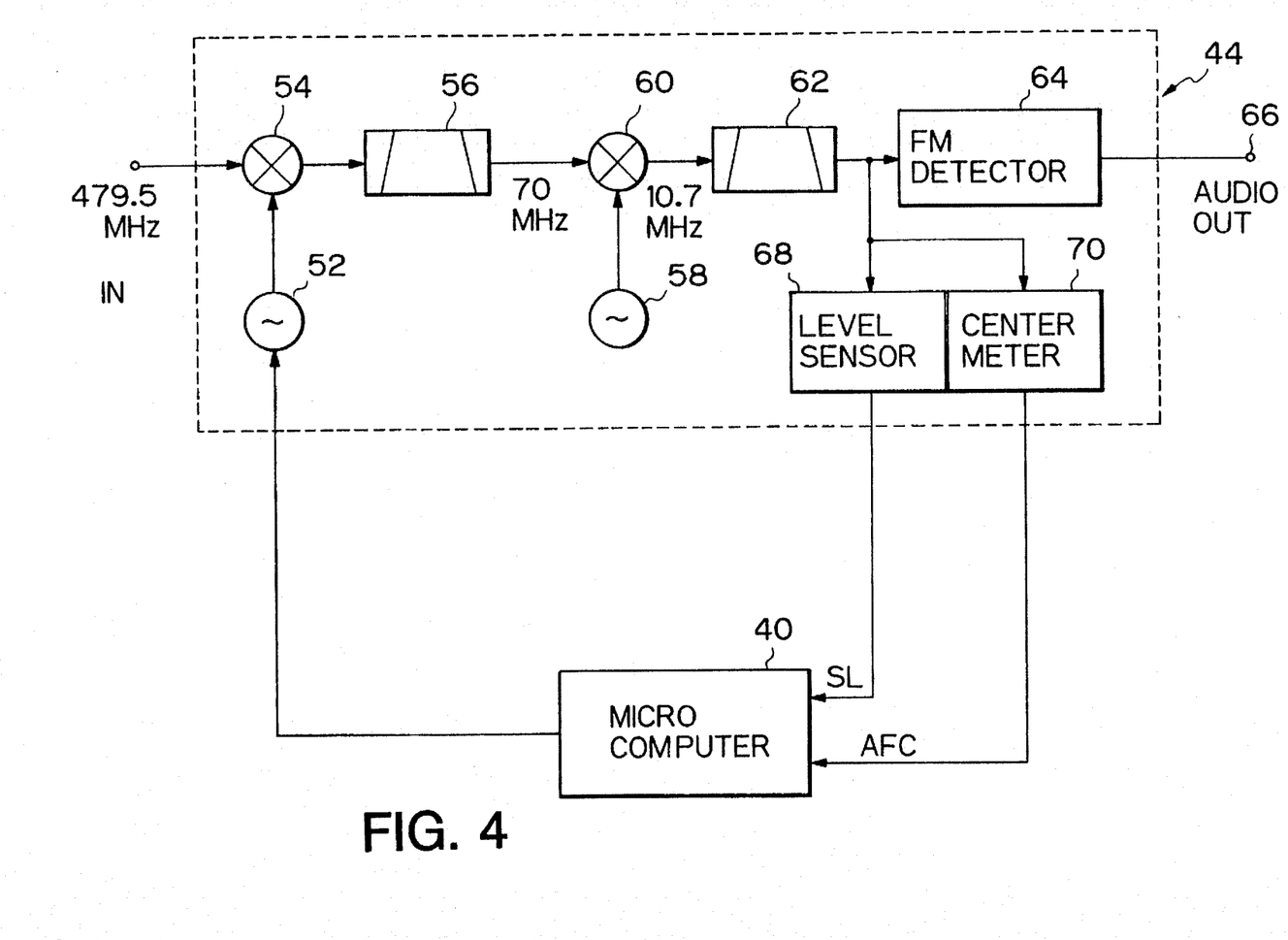
FIG. 4 shows a block diagram illustrating the structure of the SCPC receiving circuit shown in FIG. 3.

The structure of SCPC receiving circuit 44 is illustrated in detail in FIG. 4. SCPC receiving circuit 44 employs a double heterodyne system in consideration of image reception, but it is possible that receiving circuit 44 employs a single heterodyne system by narrowing a frequency bandwidth of the band-pass filter of the RF section.

SCPC receiving circuit 44 utilizing a double heterodyne system comprises a frequency synthesizer 52, a mixer 54, a band-pass filter 56, a local oscillator 58, a mixer 60, a band-pass filter 62 and an FM detector 64. The output of band-pass filter 62 is also connected to a level meter 68 for detecting a signal level inputted to FM detector 64 and a center meter 70 for detecting a deviation in frequency of a signal outputted from band-pass filter 62 from a predetermined center frequency. Circuit structures of the components of SCPC receiving circuit 44 are shown in detail in FIG. 5, wherein the respective components shown in FIG. 4 are designated by the same reference numerals.

Figure 5:
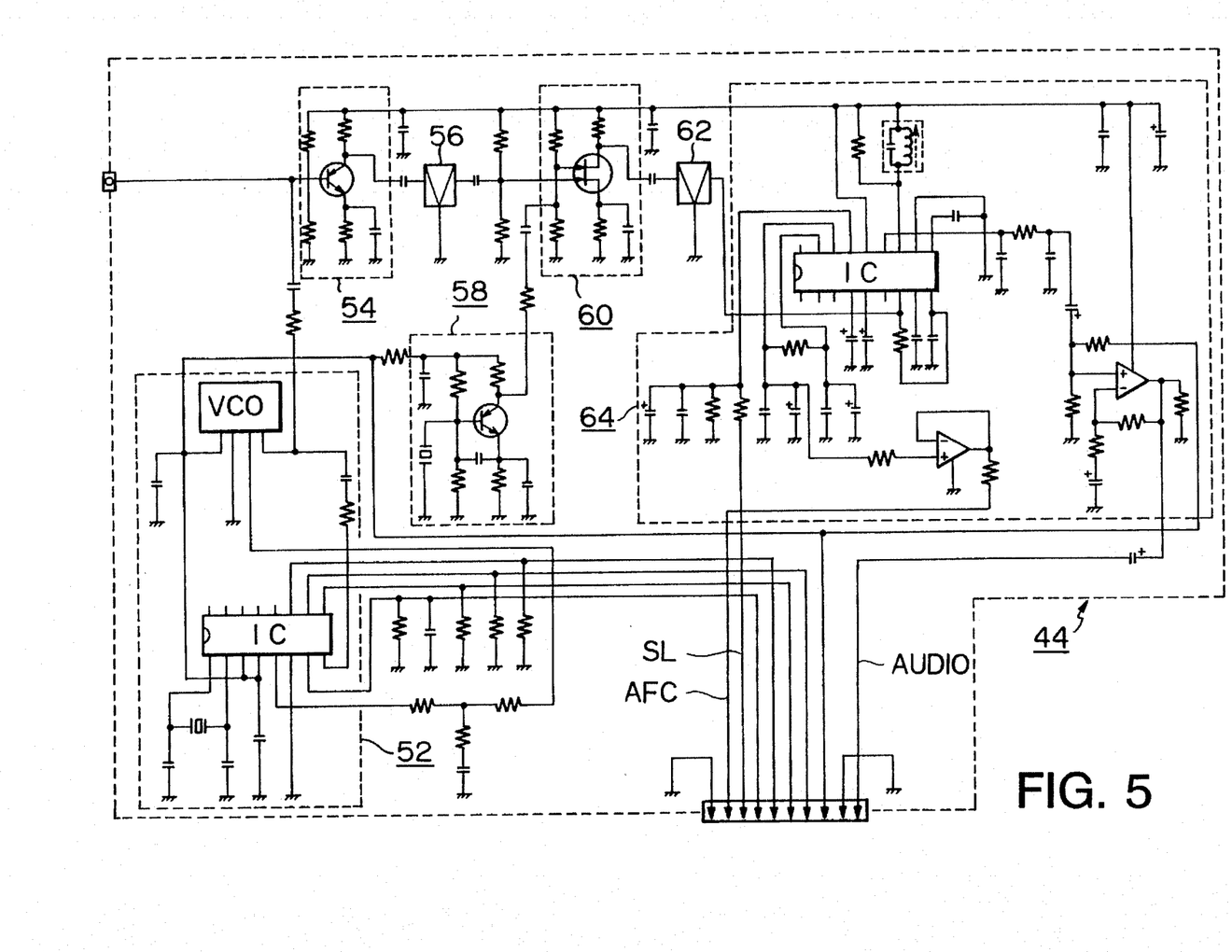
FIG. 5 shows a concrete circuit diagram of the SCPC receiving circuit shown in FIG. 4.

Operation of the embodiment shown in FIGS. 3–5 will next be described. In general, an IF frequency processed in an RF section of a satellite broadcast receiver, that is, an output frequency of band-pass filter 18 is set to 70 MHz, 140 MHz or 479.5 MHz. Because 479.5 MHz has been widely employed in recent years due to device characteristics and image frequencies, the operation of the embodiment will be hereafter described assuming that an IF frequency fed from band-pass filter 18 is 479.5 MHz.

First, a key in key switch 41 is depressed according to whether a satellite broadcast signal or an audio SCPC signal is received, thereby setting change-over device 34 to a corresponding reception position.. Microcomputer 40 controls local oscillator 14 and frequency synthesizer 52 when a desired channel is selected by key switch 41. A received signal is amplified by RF amplifier 12 and is then converted to an IF signal having an IF frequency of 479.5 MHz by mixer 16. Band-pass filter 18 outputs an audio SCPC signal having a center frequency of 479.5 MHz.

In the case where reception of the satellite broadcast signal is selected with key switch 41, a video signal is outputted from video signal output terminal 38, as in the embodiment of FIG. 2.

When reception of an audio SCPC signal is selected with key switch 41, an audio SCPC signal of 479.5 MHz supplied from band-pass filter 18 through separator 20 and IF amplifier 22 is then inputted to SCPC receiving circuit 44. In SCPC receiving circuit 44, the inputted SCPC signal of 479.5 MHz is mixed with a first LO signal of 409.5 MHz from frequency synthesizer 52 controlled by microcomputer 40. The mixed signals are converted into a first IF signal of 70 MHz by down conversion. The first IF signal is mixed with a second LO signal of 59.3 MHz fed from local oscillator 58 and the mixed signals are converted into a second IF signal (hereafter, referred to as an SCPC.IF signal) of 10.7 MHz with down conversion. The SCPC.IF signal changes around the center frequency of 10.7 MHz and is given to FM detector 64, level sensor 68 and center meter 70.

FM detector 64 converts an inputted SCPC.IF signal into a voltage by means of a frequency-voltage conversion characteristic placing the center frequency $f_c$ at 10.7 MHz and outputs the converted voltage to audio signal output terminal 66.

Figure 6:
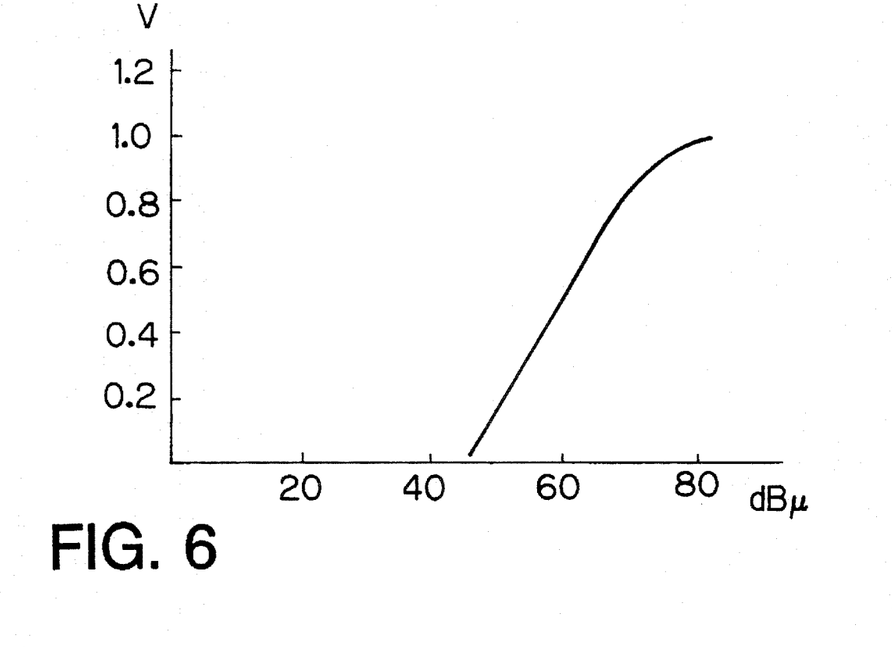
FIG. 6 illustrates an input/output characteristic of the level meter shown in FIG. 4.

Level meter 68 monitors a signal level inputted to FM detector 64 and provides an SL value indicative of the input signal level to an A/D converter contained within microcomputer 40. FIG. 6 shows an example of an input/output characteristic of the level meter. According to this characteristic, if an input signal level exceeds 45 dBμ, the output of the level meter changes within a range from 0 to 1.3 V, and, as an input signal level becomes high, an output voltage also becomes high.

By A/D converting the output of level meter 68 by microcomputer 40, a signal level can be read accurately in a step of, for example, 20 mV in the case of A/D conversion of a voltage of 5 V in 8 bits. Further, a signal level can be read as a numerical value, resulting in easy post-processing such as calculation.

Figure 7:
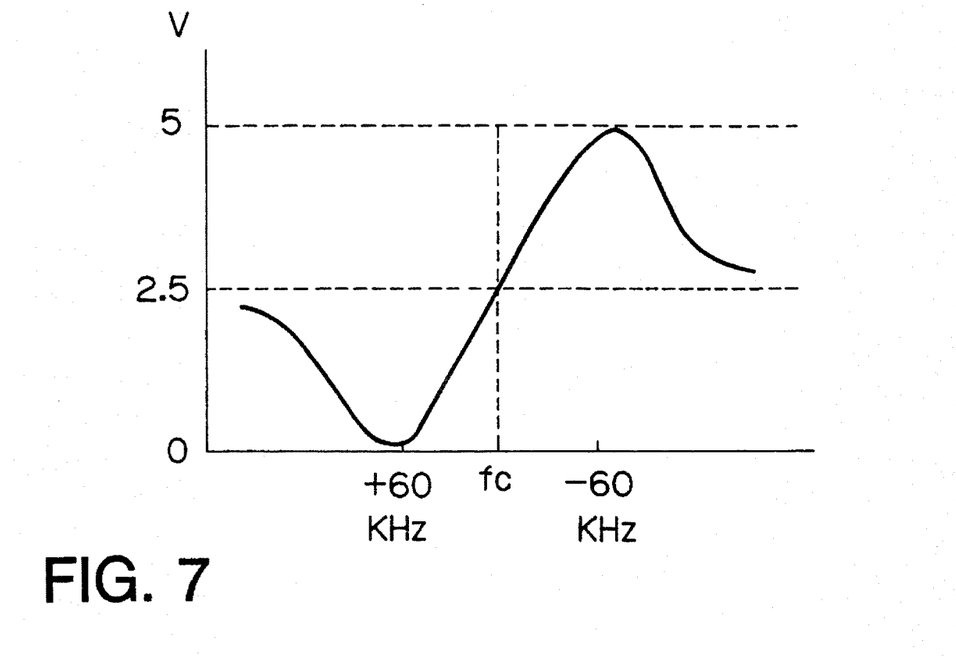
FIG. 7 illustrates an input/output characteristic of the level meter shown in FIG. 4.

Center meter 70 outputs, as a voltage referred to as an AFC value, a deviation in frequency of a signal inputted to FM detector 64 from center frequency $f_c$ of 10.7 MHz (hereinafter, referred to as center frequency deviation). An AFC value is inputted to the A/D converter within microcomputer 40. FIG. 7 shows an example of an input/output characteristic of the center meter. According to this characteristic, the center frequency deviation of a signal inputted to FM detector 64 changes in a range ±2.5 V centered at 2.5 V.

By A/D converting an AFC value by microcomputer 40, an AFC value can be read accurately as a numerical value, as in the case of an SL value, resulting in high accuracy in performing an AFC operation.

As already described in the prior arts, a reception frequency changes due to temperature drift caused in the LNB of the antenna device. The satellite broadcast receiver of this embodiment is provided with an AFC function which causes a frequency of the SCPC.IF signal to automatically follow center frequency $f_c$ in spite of change in reception frequency. This AFC function is effected by microcomputer 40.

AFC operation performed in the embodiment shown in FIGS. 3 and 4 will be explained in accordance with flowcharts shown in FIGS. 8(a) to 8(d). In the flowcharts, an SL value outputted from level meter 68 and an AFC value outputted from center meter 70 are A/D converted by microcomputer 40, a frequency deviation of the SCPC.IF signal is calculated once every 30 seconds to obtain an oscillation frequency of frequency synthesizer 52 and a frequency of the SCPC.IF signal is changed to follow center frequency $f_c$.

Figure 8A:
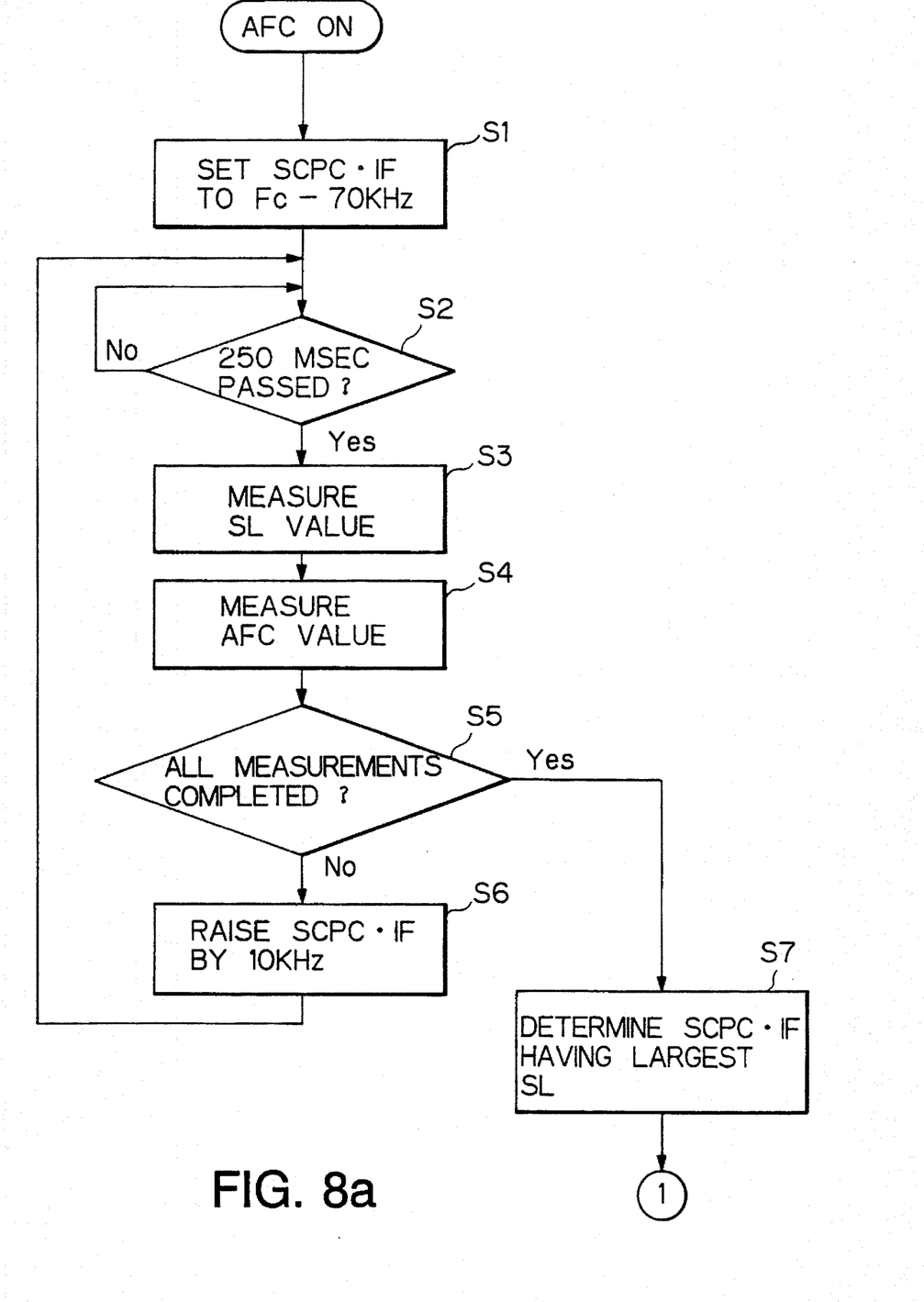
FIGS. 8(a)–8(d) show flowcharts of an AFC operation performed in the receiver shown in FIG. 3.

Referring to FIG. 8(a), when reception of an audio SCPC signal is selected by key switch 41, AFC operation is turned ON and the oscillation frequencies of local oscillator 14 and frequency synthesizer 52 are set to a selected channel and a desired signal frequency is received. Upon start of the AFC operation, a frequency of SCPC.IF signal is set to a value of $f_c$−70 kHz (step S1). Then whether 250 ms has passed or not is decided (step S2). When this period has passed, an SL value is measured (step S3) and an AFC value is measured (step S4).

Step S5 decides if measurements in steps S2, S3 have completed or not in a frequency range of $f_c$−70 kHz to $f_c$+70 kHz (step S5), and, if all the measurements have not been completed, SCPC.IF frequency is raised by 10 kHz (step S6) and the process returns to step S2 and steps S2–S6 are repeated.

SL and AFC values are measured every time the SCPC.IF frequency is raised by 10 kHz within the range of $f_c$−70 kHz to $f_c$+70 kHz. When all those values have been measured in that range (step S5), the SCPC.IF frequency having the largest SL value (peak frequency) is determined (step S7), and whether one peak frequency has not been determined or not is decided (step S8).

If one peak frequencies has not been determined, a peak frequency is determined from the SCPC.IF frequencies which give the maximum and minimum AFC values (step S9).

In step S10, the SCPC.IF frequency is adjusted to the peak frequency obtained in steps S8 and S9. This can be realized by changing the oscillation frequency of frequency synthesizer 52.

Figure 8B:
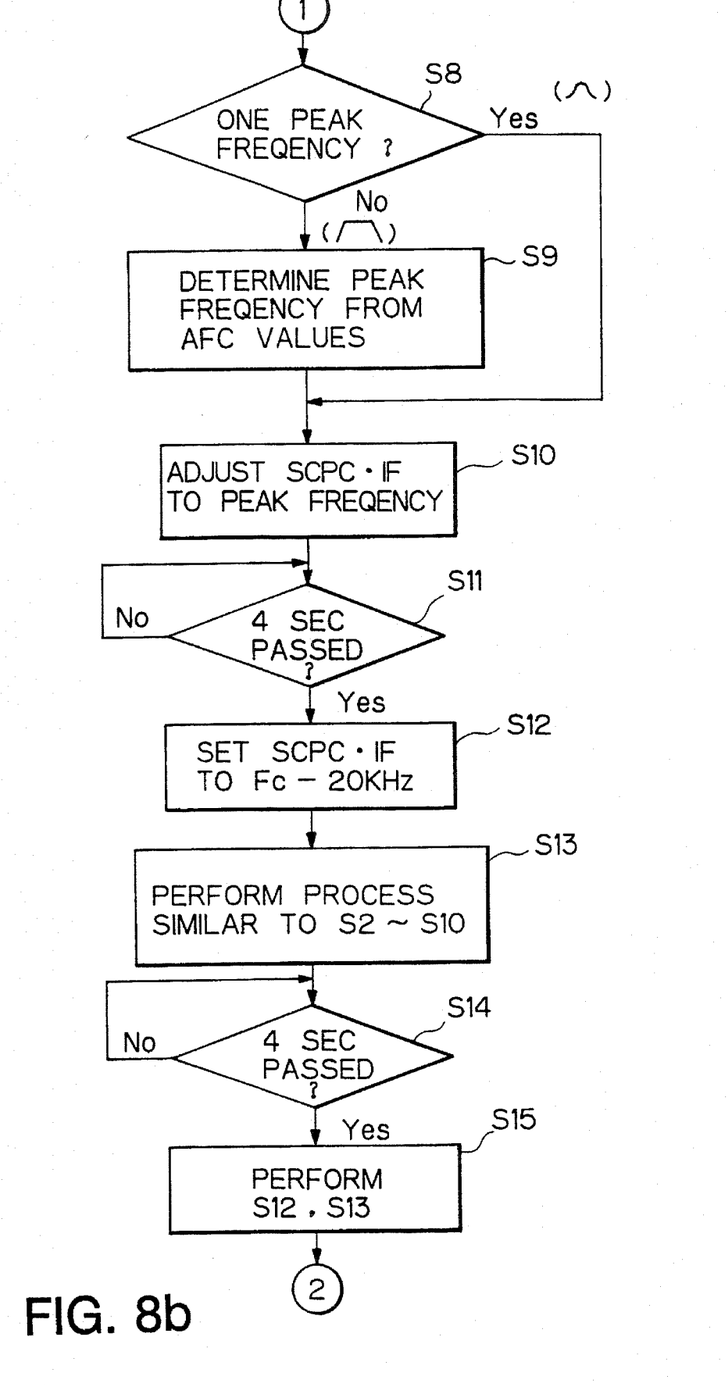

Thereafter, whether four seconds has passed or not is decided (step S11). If four seconds are decided to have passed in step S11, the SCPC.IF frequency is set to $f_c-20$ kHz (step S12) and processings similar to those performed in steps S2 to S10 are conducted in the range of $f_c-20$ kHz to $f_c+20$ kHz (step S13) whereby the SCPC.IF frequency is set to the peak frequency by changing the oscillation frequency of frequency synthesizer 52. Then, it is decided whether four seconds have passed or not in step S14, and if four seconds are decided to have passed, processings similar to those in steps S12, S13 are carried out (step S15).

As a result of the processings described above, an optimum peak frequency can be detected in the vicinity of the frequency at which the AFC operation starts, and the SCPC.IF frequency is set to the peak frequency.

Figure 8C:
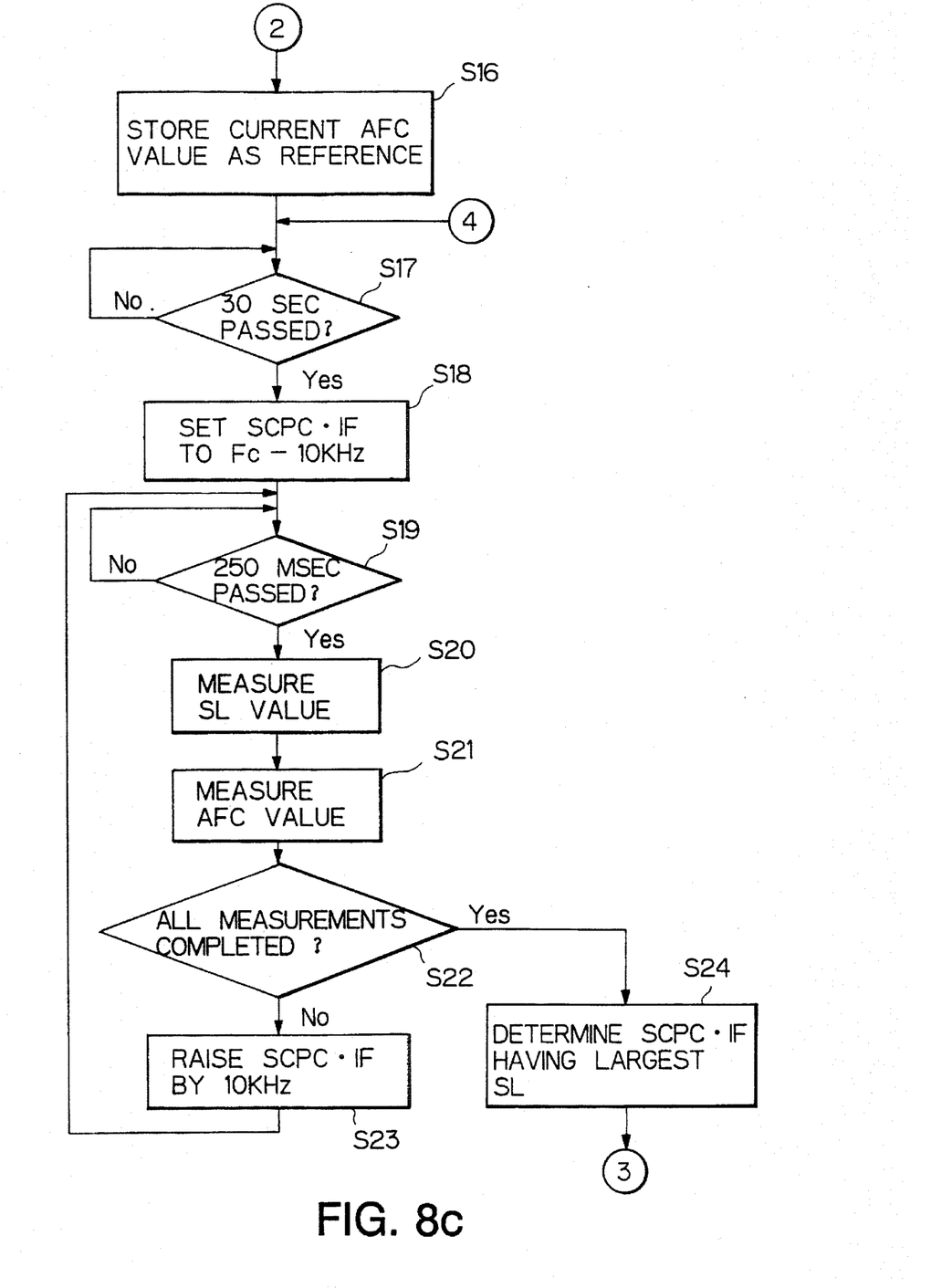

In step S16, an AFC value of a current SCPC.IF frequency is stored in a memory as a reference value. Thereafter, whether 30 seconds have passed or not is decided (step S17) and if 30 seconds are determined to have passed, the SCPC.IF frequency is set to $f_c-10$ kHz (step S18). In step S19, it is decided whether 250 ms have passed or not. If 250 ms have passed, an SL value is measured (step S20) and an AFC value is measured (step S21). Step S22 decides whether SL and AFC values have been measured within the range of $f_c-10$ kHz to $f_c+10$ kHz. If the measurement of SL and AFC values has not been completed, the SCPC.IF frequency is raised by 10 kHz (step S23), the process returns to step S19 and steps S20–S23 are repeated.

Thus, SL and AFC values are measured each time the SCPC.IF frequency is raised by 10 kHz in the range of $f_c-10$ kHz to $f_c+10$ kHz. If all the SL and AFC values have been measured (step S22), the SCPC.IF frequency which gives the largest SL value (peak frequency) is determined (step S24) and whether one peak frequency has been determined or not is decided (step S25).

Figure 8D:
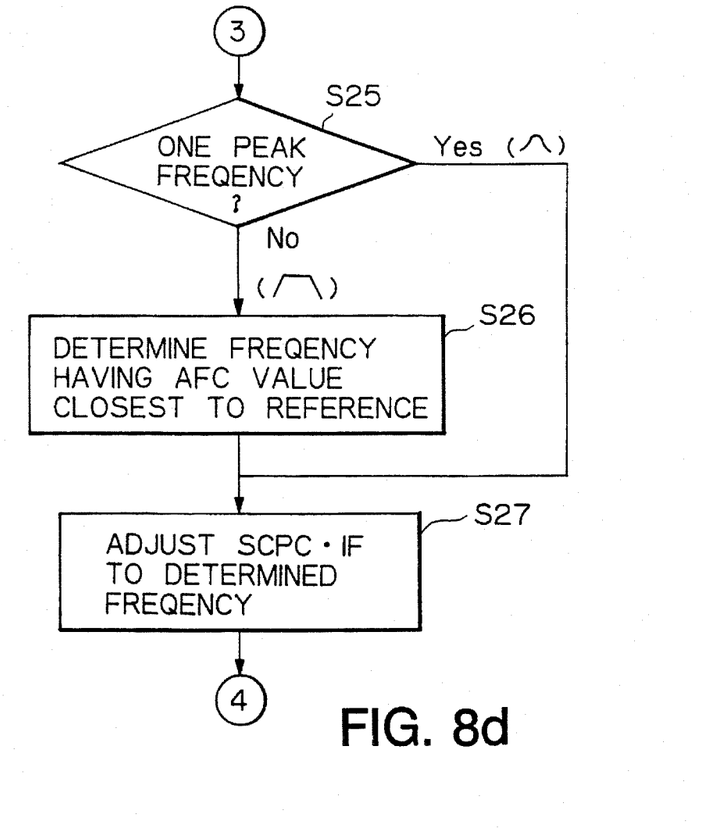

If one peak frequency has not been determined, the SCPC.IF frequency which gives an AFC value closest to the reference AFC value stored in step S16 is determined (step S26). Then, the SCPC.IF frequency is adjusted to the frequency detected in step S25 or step S26 (step S27). This can be performed by changing the oscillation frequency of frequency synthesizer 52. Thereafter, the process returns to step S17 and steps S17–S27 are repeated to compensate any variation in output frequency occurred in the LNB. As understood from the above description, the AFC operation described above may advantageously be performed in a wide frequency band.

Figure 9:
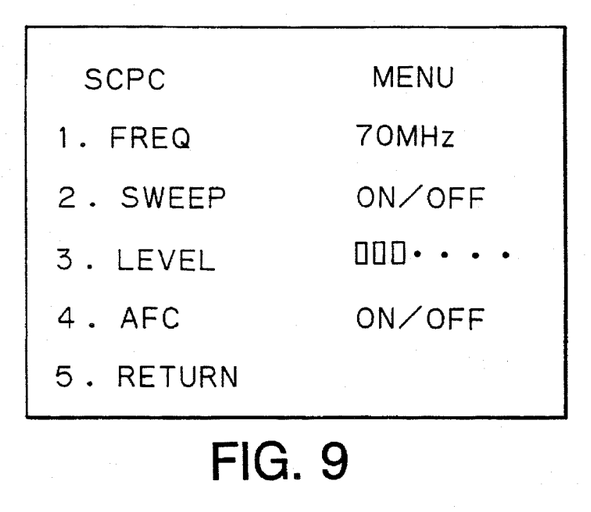
FIG. 9 shows an example of information displayed on a display screen when an audio SCPC signal is received by the receiver shown in FIG. 3.

Returning to FIG. 3, the operation of OSG circuit 46 for displaying an audio SCPC signal receiving condition on a television screen during reception of an audio SCPC signal will be explained hereunder. OSG circuit 46 receives information indicative of an SCPC signal receiving condition from microcomputer 40, converts the information into a video signal and then outputs the video signal to video output terminal 38. The signal outputted from terminal 38 is displayed on a TV screen in order to provide such information as a receiving frequency (FREQ), whether a frequency sweep is ON or OFF (SWEEP), an SL value from level meter 68 (LEVEL), whether AFC is ON or OFF and a return to a normal video mode (RETURN), as shown in FIG. 9.

While preferred embodiments of the present invention have been described and illustrated herein, a person skilled in the art will appreciate that changes and modifications may be made therein without departing from the spirit and scope of this invention as defined in the appended claims.

What is claimed is:

1. A receiver capable of selectively receiving satellite broadcast television signals of audio SCPC signals, comprising:

RF reception means for receiving television signals and audio SCPC signals broadcast from a satellite;

frequency conversion means for converting an RF output from said RF reception means into an IF signal;

separation means for separating the output of said frequency conversion means into a television signal and an audio SCPC signal, and for producing a first output including the television signal and a second output including the audio SCPC signal;

a TV signal processing unit for receiving and processing the first output from said separation means;

an SCPC signal processing unit for receiving and processing the second output from said separation means; and selection means for selecting any one of the outputs from said TV signal processing unit and said SCPC signal processing unit, thereby enabling selective reception of TV signals and audio SCPC signals broadcast from a satellite.

2. A receiver as set forth in claim 1, wherein said RF reception means comprises an RF amplifier, said receiver further comprising means for selectively feeding either the first output or the second output of said separation means back to said RF amplifier to control a gain of said RF amplifier, the first output being fed back when a desired portion of the RF output is a television signal and the second output being fed back when a desired portion of the RF output is an audio SCPC signal.

3. A receiver as set forth in claim 2, wherein said TV signal processing unit includes a video detector for receiving and detecting a television signal from said separation means, an audio circuit for receiving an audio signal from said video detector, and a video circuit for receiving a video signal from said video detector, and wherein said selection means comprises a switch for selecting any one of the outputs of said SCPC signal processing unit and the audio circuit.

4. A receiver capable of selectively receiving satellite broadcast television signals or audio SCPC signals, comprising:

an IF unit for converting a signal including satellite broadcast signals or audio SCPC signals into an IF signal;

separator means for receiving and separating the IF signal into a first output corresponding to an audio SCPC signal and a second output corresponding to a satellite broadcast signal;

SCPC reception means connected to receive the first output of said separator means;

video detector means connected to receive the second output of said separator means;

audio signal processing means connected to receive an audio output of said video detector means;

video signal processing means connected to receive a video output of said video detector means;

audio signal switching means connected to outputs of said SCPC signal processing means and said audio signal processing means for selecting an audio signal produced by the SCPC reception means or an audio signal produced by the audio signal processing means.

5. A receiver as set forth in claim 4, further comprising:

a first IF amplifier connected between said separator means and said SCPC reception means; and a second IF amplifier connected between said separator means and said video detector means.

6. A receiver as set forth in claim 5, further comprising an RF amplifier, wherein in the case of audio SCPC signal reception, a first AGC signal is fed from said first IF amplifier back to an RF amplifier, whereas, in the case of satellite broadcast signal reception, a second AGC signal is fed from said second IF amplifier back to said RF amplifier.

7. A receiver capable of selectively receiving satellite broadcast television signals or audio SCPC signals, comprising:

reception means for receiving television signals and audio SCPC signals broadcast from a satellite and producing an RF signal;

RF amplification means for amplifying the RF signal from said reception means to produce an amplified RF signal;

frequency conversion means for converting the amplified RF signal into an IF signal;

separation means for separating the output of said frequency conversion means into a first output corresponding to a television signal and a second output corresponding to an audio SCPC signal;

SCPC reception means connected to the first output of said separation means;

video detector means connected to the second output of said separation means;

audio signal processing means connected to receive the output of said video detector means;

video signal processing means connected to receive the output of said video detector means;

audio signal changeover means connected to said SCPC reception means and said audio signal processing means for selecting any one of the outputs of those means; and control means for controlling said SCPC reception means in response to information about a condition of receipt of the audio SCPC signal.

8. A receiver as set forth in claim 7, further comprising:

a first IF amplifier provided between said separation means and said SCPC reception means; and a second IF amplifier between said separation means and said video detector means.

9. A receiver as set forth in claim 8, wherein, in the case of receiving an SCPC signal, a first AGC signal is fed from said first IF amplifier back to an RF amplifier, and wherein, in the case of receiving a satellite broadcast signal, a second AGC signal is fed from said second IF amplifier to said RF amplifier.

10. A receiver as set forth in claim 7, wherein said SCPC reception means comprises:

a frequency converter for mixing the output of a frequency synthesizer and an audio ACPC signal from said separation means for converting it into a SCPC.IF signal having a predetermined center frequency;

an FM detector for FM-detecting the SCPC.IF signal from said frequency converter to output an audio signal; and measurement means for outputting an SL value representing a signal level of the SCPC.IF signal inputted to said FM detector and an AFC value indicating a deviation of the center frequency of the SCPC.IF signal from the predetermined center frequency, and wherein said control means comprises a microcomputer which, responsive to the SL and AFC values from said measurement means, control an oscillation frequency generated by said frequency synthesizer to cause a frequency of the SCPC.IF signal to coincide with the predetermined center frequency.

11. A receiver as set forth in claim 10, wherein said microcomputer comprises:

means for changing an oscillation frequency of said frequency synthesizer at predetermined intervals;

means for receiving the SL and AFC values from said measurement means during the change of the oscillation frequency in the predetermined interval; and means for determining a frequency of the SCPC.IF signal using the received SL and AFC values, thereby controlling the oscillation frequency of said frequency synthesizer on the basis of the determined frequency.

12. A receiver as set forth in claim 7, further comprising an OSG circuit for changing information about a reception condition of an audio SCPC signal to a video signal to cause the video signal to be displayed.

* * * * *